Oct. 28, 1969  L. W. COVER, JR., ET AL  3,474,952
FILM/NETTING SEAL
Filed Feb. 18, 1965  2 Sheets-Sheet 1
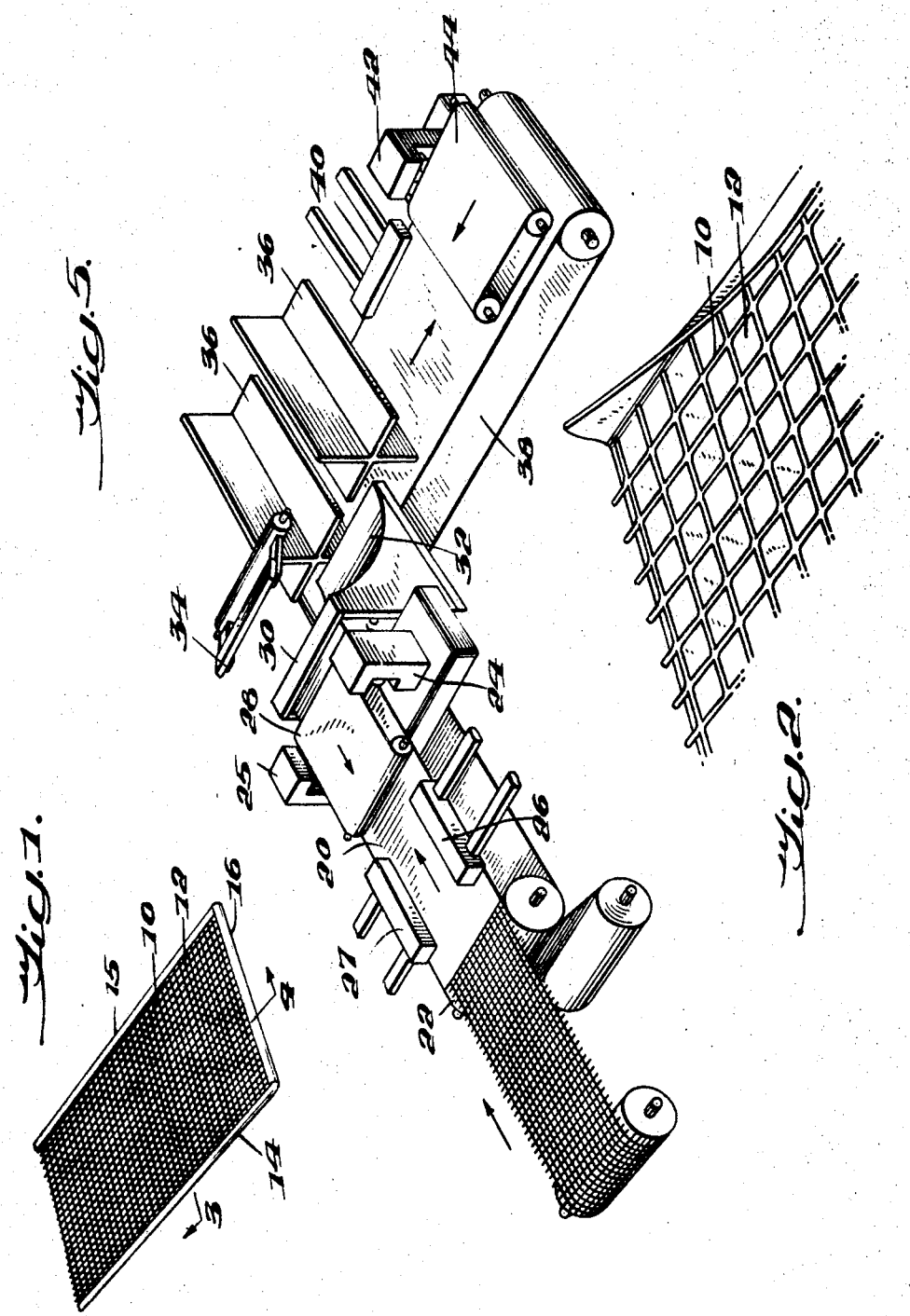

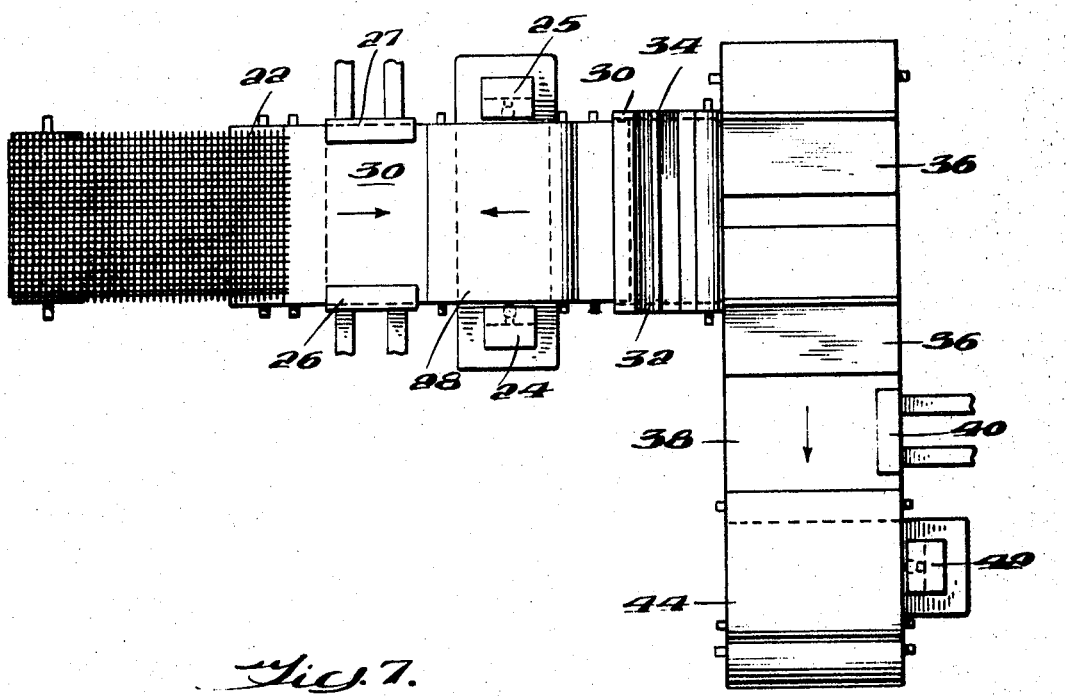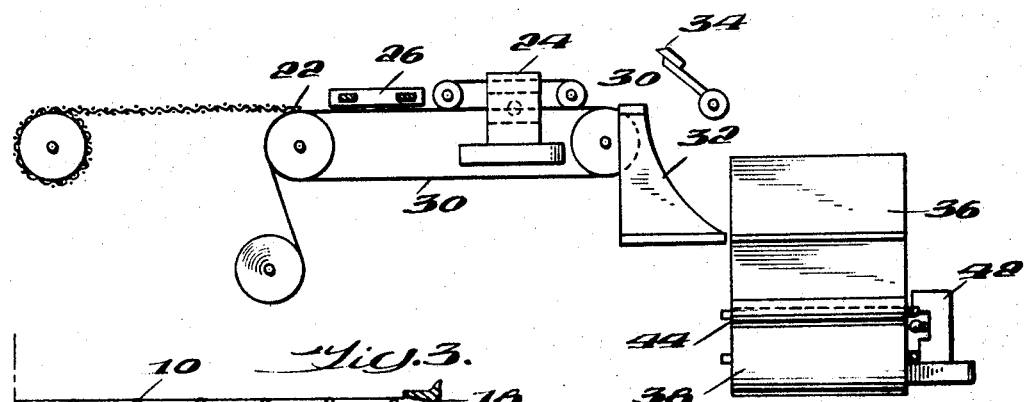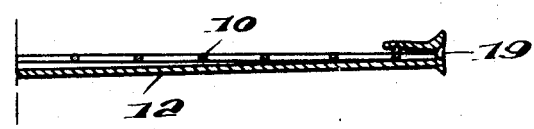

United States Patent Office 3,474,952
Patented Oct. 28, 1969

---

3,474,952
FILM/NETTING SEAL
Lloyd W. Cover, Jr., Trumbull, Conn., and James S. McDaniel, Buffalo, N.Y., assignors to E. I. du Pont de Nemours and Company, Wilmington, Del., a corporation of Delaware
Filed Feb. 18, 1965, Ser. No. 433,578
Int. Cl. B65d *31/02*
U.S. Cl. 229—53          10 Claims This invention relates to a unique seal joining plastic film to plastic netting.

For many purposes it is desirable to use together diverse sheets of film and netting. Particular application is found in bags used for packaging various produce products. Adequate ventilation is provided by the netting surface while the film surface in addition to enhancing dimensional stability affords support for printing or affixing a label. The major problems encountered in manufacturing plastic bags of this nature have been centered about obtaining an effective seal between the film and the netting. The most common presently available method for effectuating this seal is to apply heated clamps to the region to be sealed. Disadvantages inherent in this method are the difficulty of adaptation to a continuous process, and the necessity for critical temperature and pressure control so as not to significantly weaken or sever the net strands on fusing.

According to the present invention, there is provided an article comprising plastic film and plastic netting wherein a portion of said plastic netting is joined to a portion of said plastic film by a seal comprising nodules of plastic netting fused to the inside of an envelope of plastic film and wherein the plastic film is shrunk about the nodules. The seal of this invention can be made by radiantly heating an edge having plastic netting enclosed by an envelope of plastic film such that the plastic netting melts into nodules which fuse to the plastic film and the plastic film aside from its area of contact with the nodule remains substantially unmelted while shrinking about the nodule. The plastic film, plastic netting seal of this invention, while possessing desirable strength characteristics can in addition be accomplished continuously without the necessity of applying pressure to the region to be sealed and thus avoiding the previously mentioned disadvantages.

The seal of this invention and the method for making it can be shown by the attached drawings, wherein FIGURE 1 is a perspective view of a plastic bag.

FIGURE 2 is a large detail view showing a turned-up edge of a folded double layer of material.

FIGURE 3 is a cross-section on line 3—3 of FIGURE 1.

FIGURE 4 is a cross-section on line 4—4 of FIGURE 1.

FIGURE 5 is a perspective view of a preferred form of apparatus for carrying out the process of sealing bags of this invention.

FIGURE 6 is a plan view of the apparatus shown in FIGURE 5.

FIGURE 7 is a side elevation view of the apparatus shown in FIGURE 5.

Referring in more detail to the drawings, FIGURE 1 shows an embodiment of this invention in a bag having plastic netting 10 on the top side and plastic film 12 on the bottom. The film 12 is shown folded over the netting 10 at the side edges 14 and 15 and at the bottom edge 16. FIGURE 2 shows the fold along edges, such as 14 and 15, before sealing in more detail. The plastic film 12 is shown to enclose the netting 10 in an envelope fashion with the film folded over the netting at an edge. For purposes of illustrating the manner in which the film folds over the netting edge, the end of film is shown to be turned up. It is to be understood that when effectuating the seal, the film lies flat over the netting. The fold at the bottom edge 16 is of a similar fashion except that the netting is also folded, though still enveloped by the film. FIGURES 3 and 4 show in more detail the sealed side and bottom edges, respectively. In FIGURE 3, the nodule of netting 18 is shown anchored to the inside of the shrunken envelope of plastic film 12 at the side edge 14, while FIGURE 4 shows a nodule of netting 19 anchored to the inside of the shrunken envelope of plastic film 12 at the bottom edge 16. FIGURE 4 also shows the netting folded over at the bottom edge. As can also be seen from FIGURES 3 and 4, the folded over portion of the film is shrunk about the nodule of netting in addition to the nodule being fused to the film at the edges.

The process for making the seal of this invention has found preferred use in the manufacture of plastic bags and can be understood by reference to FIGURE 5. A double layer of material 22 having a bottom layer of plastic film and a top layer of plastic netting is initially passed by the continuous belt 20, driven by means not shown, through the folding machines 26 and 27. The bottom layer of film on entering the folding machines extends a portion (generally from ⅛ inch to ½ inch) on each edge beyond the plastic netting, and this portion is continuously folded over the top layer of plastic netting in an envelope fashion along the side edges. The double layer of material 22 on emerging from the folding machines 26 and 27, extends on both sides over the edge of the continuous belt 20, by which it is conveyed. It is subsequently engaged from above by a second continuous belt 28, driven by means not shown, having the same width, moving at the same speed, and being positioned directly above the continuous belt 20. Thus, the double layer of material is clamped between the two continuous belts. The double layer of material 22 is conveyed by the two continuous belts 20 and 28, past the radiant heaters 24 and 25 such that only that portion extending over the edges of the continuous belt 20 and continuous belt 28 is exposed to the radiant heaters 24 and 25. The amount that the folded edge extends beyond the belts is not critical so long as it does not exceed the point at which part of the top folded over film can still be engaged and thus clamped between the two continuous belts. Generally, an extended portion ranging from ¹⁄₁₆ inch to ¼ inch is desirable. Thus, only a portion of the folded film and included netting is exposed, the remainder of the fold and material being insulated from the radiant heat by being clamped between the two continuously moving belts. On passing beneath the radiant heaters, the unrestrained ends of the plastic netting within the fold are melted and due to their elastic memory characteristics form nodules which fuse at their point of contact to the inside of the plastic film envelope. Substantially at the same time as the netting ends melt, the plastic film envelope, similarly unrestrained, shrinks about the nodules, thus, sealing the side edges of the double layer of material 22.

The sealed edge double layer of material moves continuously over the cutting edge 30 and is cut perpendicular to the sealed edges by severing the double layer of material between the rotary cutting knife 34 and the cutting edge 30. The rotational speed of the rotary cutting knife 34 determines the bag length. After severing the double layer of material 2, the individual bag lengths slide down the arcuate surface 32 onto the star wheels 36.

A third continuous belt 38, driven by means not shown, receives the individual bag lengths from the star wheels 36 such that the two open ends of each individual bag length are parallel to the edges of the continuous belt 38. The continuous belt 38 conveys the individual bag lengths through a second folding machine 40 in which one of the open ends of the bag lengths is continuously folded over.

The bag length with the folded end extending over the edge of the continuous belt 38 is conveyed and clamped between the continuous belt 38 and a fourth continuous belt 44 similar in design and operation to the continuous belt 28. Likewise, the folded edge is exposed and subsequently passes under a third radiant heater 42 where the extended folded over end of the bag length is sealed in the same manner as were the sides. Additionally, it may be found desirable to flatten the sealed edges and end immediately after exposure to the radiant heat and while the edges are still somewhat soft. This is usually done to enhance appearance and is not critical for forming a secure seal. Thus, a bag is formed by this process which is sealed on three edges and open on one edge.

As described, the continuous folding operations in the process of this invention are accomplished by the folding machines 26, 27, and 40. The folding machines can be selected from a wide variety of well known devices so long as the essential object of the continuously folding one or several edges to form what is known in the art as a J-fold is accomplished. U.S. Patents 273,790 and 1,001,443 set forth representative examples of methods and apparatus by which these continuous folding operations can be accomplished.

The materials that can be used in forming the bag of this invention can be any of those thermoplastic polymeric materials commonly used in plastic bag manufacture. The most common of these are heat sealable films of polyethylene and polypropylene. However, other useful heat sealable films are those made of any of the following: acrylonitrile/styrene copolymers, cellulose triacetate, cellulose acetate butyrate, polyurethane elastomers, fep-fluorocarbons, selected polyamides, polytrifluorochloroethylene, selected polyesters, polycarbonates, polystyrene, polyvinyl chloride, vinyl-chloride/acetate copolymers, vinylidene chloride/vinyl chloride copolymers, rubber hydrochloride, acrylates, methacrylates, polyolefins, olefin copolymers and blends thereof. Similarly, the plastic netting can be of any of those materials commonly used and of any mesh design, such as diamonds or squares. U.S. Patent 2,919,467 sets forth suitable plastic net materials, mesh designs, and methods of production. Forms found to be particularly suitable are those marketed in the United States under the trademark "Vexar" plastic netting, made by E. I. du Pont de Nemours and Company. Useful forms in which "Vexar" plastic netting is available are: high density polyethylene; low density polyethylene; blends of high and low density polyethylene; polypropylene; ethylene/propylene copolymer; and blends of polyethylene and ethylene/butane copolymer. A preferred form of "Vexar" plastic netting for bag manufacture is low density polyethylene.

While the particular selection of film and netting is not critically limited to specific materials, several conditions must be considered and met to effectuate the unique seal of this invention. Primarily, it is necessary that, on exposure to radiant heat, the netting, enclosed by an envelope of film, melt before the enveloping film. For practical operation, it is preferable that the film melt very little and only at its contact point with the netting nodule. Obviously selecting a netting which melts over a lower temperature range than the enveloping film will be satisfactory so long as the surface temperature of the edge exceeds the melting range of the netting while being below the melting range for the film. However, it is also possible to select a netting which while comparative in melting range to the film has a higher rate of absorption of heat and thus, melts quicker. A convenient method for increasing the rate of heat absorption of the netting relative to the film is to use colored netting (i.e., red, black, blue, green, yellow, etc.) while using a virtually colorless (i.e., possessing natural color) film. Nettings, such as the aforementioned "Vexar" plastic netting, are available in a variety of colors. To effectuate the seal of this invention, in addition to the necessity of having a melting difference, it is desirable that the film and netting be capable of shrinking on heating of at least three percent and preferably less than five percent. Thus, the seal of this invention is formed by discrete nodules of melted plastic netting being anchored into an envelope of plastic film. The anchoring of the nodules occurs by fusion of the nodule to film at its point of contact and by the simultaneous shrinkage of the film about the nodule. It is desirable for seal strength that the film be substantially unmelted. As used in this invention, the term substantially unmelted means that aside from its point of contact with the nodule, any melting of the film does not occur to an extent where the film loses its physical form and resultant strength characteristics. It is to be understood that interfacial wetting between opposite film surfaces can occur without the film losing its physical form and, thus, for additional strength the film can seal to itself as well as the necessary fusing to the nodule.

The radiant heaters 24 and 42 used in the sealing process can be any of those commercially available and operable at surface temperatures between 325° F. and 1200° F. Found particularly suitable are radiant heaters of the "Calrod" type. For practical application, when sealing polyethylene film ranging in thickness from 0.5 mil to 5.0 mil and "Vexar" netting having a diameter from 2 mil to 100 mil, the radiant heaters are placed about ⅜ inch to 9 inches away from the material which travels at such a speed as to result in a dwell time of exposure under the heaters of from about two to five seconds. Generally, for sealing the well known films and nettings previously set forth, the radiant heater temperatures and distances are adjusted such that the surface temperature of the moving edge or edges has a value of between 235° F. and 350° F. Naturally, the optimum values of the aforementioned temperatures, distances, and dwell times will depend upon the particularly physical characteristics (i.e., melting range and shrinkage rates) of the materials being sealed, and should be chosen accordingly.

It is also evident that the dimensions (i.e., thickness, length and width) of film, netting, and eventual article are not critically limited to effectuate the seal of this invention. Depending upon the dimensions, the values of surface temperature and dwell time can also be appropriately adjusted.

A practical example of the seal of this invention can be effected between 2 mil polyethylene film and 10 mil diameter red "Vexar" netting by exposing the folded edge to a radiant heater placed 3 inches from the edge with a heater surface temperature of about 1000° F., resulting in a maximum surface temperature of the edge of about 350° F. Under the above conditions for a ⅓ inch square mesh design and a dwell time of about two seconds, a strong uniform seal is accomplished.

Though the preferred embodiment of the seal of this invention has been shown to be used in the manufacture of bags, it should be evident that this unique seal can be used in the manufacture of any article where a strong effective seal between netting and film is desired. In particular, the use of this seal for bag manufacture is not limited solely to a double layer bag as shown in the drawings. For instance, the commonly available gusseted type bags having multiple layers (multi-layer bags) of film and/or netting can be readily manufactured using the seal and process of this invention.

What is claimed is:

1. An article comprising plastic film and plastic netting wherein a portion of said plastic netting is joined to a portion of said plastic film by a seal comprising nodules of said plastic netting fused to the inside of an envelope of said plastic film and wherein said plastic film is shrunk about said nodules.

2. The article of claim 1 wherein the plastic film and plastic netting are chosen such that on exposure to radiant heat sufficient to melt said plastic netting, said plastic film remains substantially unmelted and wherein said plastic netting and said plastic film have a heat shrinkability of at least three percent.

3. The article of claim 2 wherein said article is a plastic bag being sealed on three edges and open on one.

4. The plastic bag of claim 3 wherein the plastic netting is colored low density polyethylene and the plastic film is colorless polyethylene.

5. A method for making a seal between plastic netting and plastic film at an edge, wherein said plastic netting is enclosed by an envelope of said plastic film formed by folding said plastic film over said plastic netting which comprises: clamping said plastic film and said plastic netting such that only a portion of the folded film and included netting is unrestrained; and radiantly heating said unrestrained portion such that said plastic netting melts into nodules and said plastic film remains substantially unmelted and shrinks about said nodules.

6. The method of claim 5 wherein said step of radiantly heating said edge results in a surface temperature of said edge of from about 235° F. to 350° F.

7. A process for forming plastic bags which comprises: continuously advancing a multi-layer of flat material, said multi-layer comprising a layer of plastic netting and a layer of plastic film with said plastic film layer extending a portion, in a direction perpendicular to the advancing direction, beyond the edges of said plastic netting layer; continuously folding said extended portions of said plastic film layer over said plastic netting layer to form folded side edges; clamping said multi-layer of flat material such that only a portion of the folded film and included netting is unrestrained; sealing said unrestrained folded side edges of said continuously advancing multi-layer by radiantly heating so that the plastic netting melts into nodules and said plastic film remains substantially unmelted and shrinks about said nodules; cutting the advancing multi-layer into individual bag lengths open on both ends and sealed on both edges; advancing said individual bag lengths and continuously folding over one of said open ends to form a folded bottom edge; clamping said individual bag length such that only a portion of the fold at the bottom edge is unrestrained; sealing said folded bottom edge of the advancing bag lengths by radiant heat to form bags sealed on three sides and open on one.

8. The process of claim 7 wherein said steps of sealing said folded side edges and said folded bottom edge by radiant heat are accomplished such that the surface temperature of said folded side edges and said folded bottom edge during sealing is between about 235° F. and 350° F.

9. The process of claim 8 wherein said multi-layer is a double layer having a bottom layer of plastic film and a top layer of plastic netting.

10. The process of claim 9 wherein said plastic film is colorless polyethylene and said plastic netting is colored low density polyethylene.

References Cited

UNITED STATES PATENTS

| | | | |
|---|---|---|---|
| 3,297,509 | 1/1967 | Mercer | 156—271 |
| 3,143,456 | 8/1964 | McGrath et al. | 161—101 |
| 3,017,302 | 1/1962 | Hultkrons. | |
| 2,332,373 | 10/1943 | Dorough et al. | 161—92 X |
| 3,270,370 | 9/1966 | Mercer | 18—12 |

ROBERT F. BURNETT, Primary Examiner

M. A. LITMAN, Assistant Examiner

U.S. Cl. X.R.

18—12; 156—272, 302, 306, 309; 161—104, 109, 113; 264—176